March 22, 1949.　　A. J. PIERSON ET AL　　2,465,117
COMBINED CART AND SPREADER
Filed Aug. 19, 1944　　2 Sheets-Sheet 1
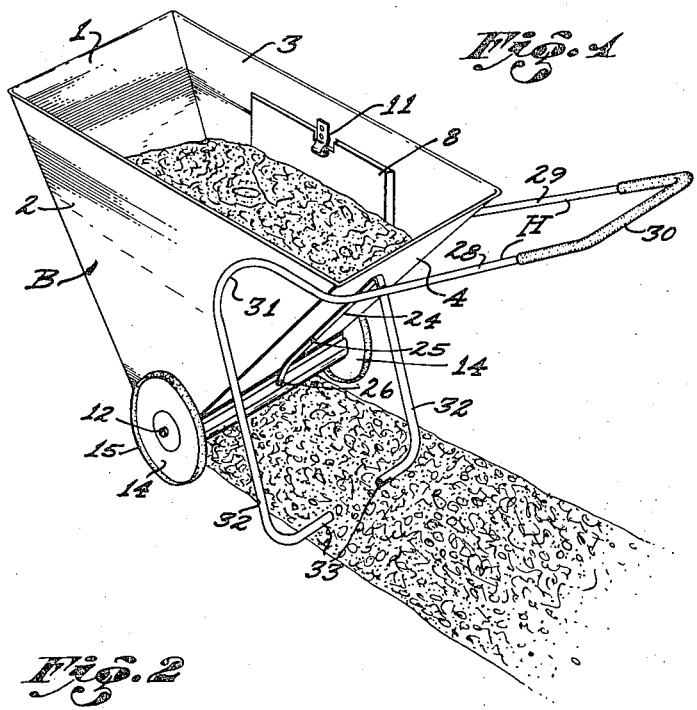
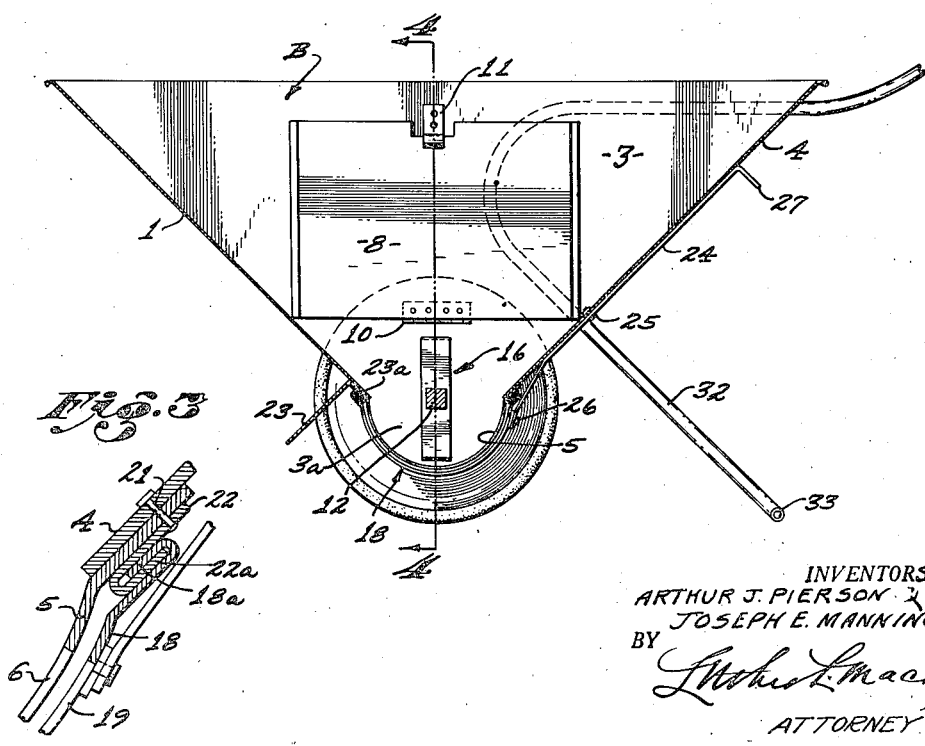
INVENTORS:
ARTHUR J. PIERSON
JOSEPH E. MANNING
BY
ATTORNEY

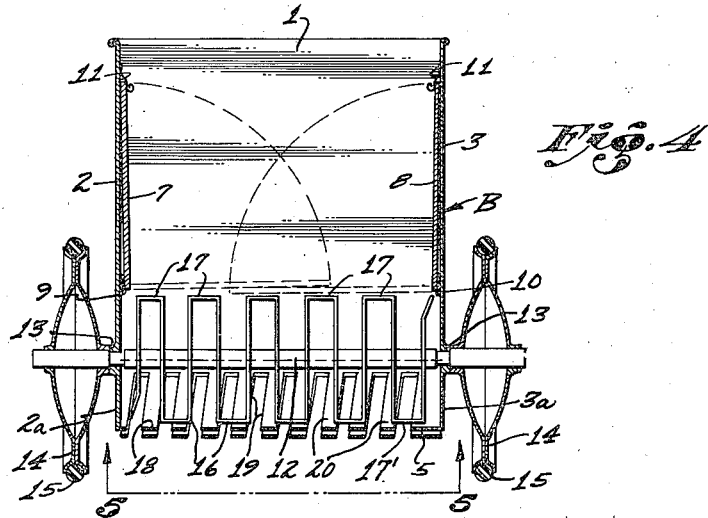
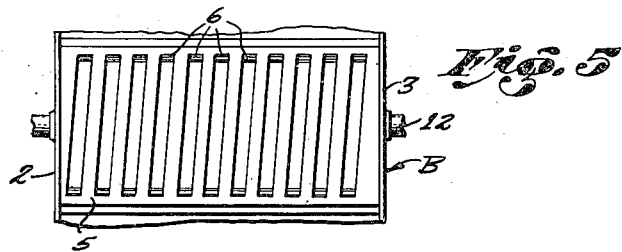
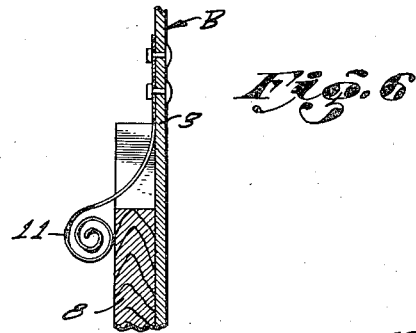

Patented Mar. 22, 1949

2,465,117

UNITED STATES PATENT OFFICE 2,465,117

COMBINED CART AND SPREADER

Arthur J. Pierson, North Hollywood, and Joseph E. Manning, Burbank, Calif.

Application August 19, 1944, Serial No. 550,186

2 Claims. (Cl. 275—2)

This invention relates to and has for an object, the provision of a combined cart and spreader adapted for various and sundry uses on farms, estates or even small home plots for transporting articles or materials after the fashion of a wheel barrow as well as for carrying and uniformly spreading materials, such as chemicals, fertilizer, earth and sand, over surfaces to a desired thickness.

Another object is to provide in a vehicle of the character described, a barrow-like body provided with a bottom capable of being opened or closed at will, depending upon the use to which the vehicle is to be put, traction wheels suspended from the bottom and cooperating stationary and adjustable means also mounted on the bottom for either closing the bottom against the discharge of a material from the body or for regulating the size of the openings in the bottom so as to regulate the volume of material discharged for spreading upon a surface.

A further object is to provide a rotatable member operatively connected with the traction wheels and having peripheral portions disposed in proximity to the bottom closure for agitating the material and preventing the caking thereof and thereby insuring a uniform flow of material from the cart to the surface to be treated while the cart is in motion.

Other objects will appear as the description progresses.

We have shown a preferred form of vehicle embodying our improvements in the accompanying drawing, subject, however, to modification, within the scope of the appended claims, without departing from the spirit of our invention. In said drawings:

Fig. 1 is a perspective view of our improved vehicle as seen while the same is being used as a spreader for fertilizer, etc.;

Fig. 2 is a sectional elevation of the vehicle taken on a longitudinal median plane between its sides;

Fig. 3 is an enlarged detail section of a portion of the vehicle body adjacent the bottom;

Fig. 4 is a sectional elevation on line 4—4 of Fig. 2;

Fig. 5 is a bottom plan view of the bottom of the vehicle showing the variable openings therein through which the contained material is distributed over the surface of the ground;

Fig. 6 is an enlarged sectional view of a side of the body showing a manner of supporting the false bottom in open position.

Our improved cart and spreader includes a body B of hopper-like triangular cross section formed with a front sloping end 1, substantially triangular sides 2 and 3 and a rear sloping wall 4, the walls 1 and 4 being spaced apart at their lower edges and connected by a substantially semi-circular fixed bottom 5 having a plurality of uniformly spaced and sized angularly disposed elongated apertures 6 formed therein throughout the length of the bottom. In a plane above the fixed bottom 5, we provide a pair of similar leaves 7 and 8 which are, respectively, hinged at points 9 and 10 to the sides 2 and 3. When the leaves 7 and 8 are in closed position, as shown in broken lines in Fig. 4, their free edges substantially overlap for holding loose material in the body in such a manner that it may not be discharged through the openings 6 of bottom 5. When used as a spreader, the leaves 7 and 8 are supported vertically against the sides 2 and 3 and may be held as by means of spring clips 11, carried by the sides of the body B.

Sides 2 and 3 are extended downwardly for closing the ends of the fixed bottom 5 as at 2a and 3a, said extensions also serving to journal a transverse shaft 12 as in suitable bearings 13 either formed on or attached to said extensions. Traction wheels 14, 14, are fixed to the extended ends of shaft 12 and are preferably provided with resilient tires 15. An agitator and distributor 16 is mounted within the concave space of bottom 5 and in fixed position on shaft 12 so that as said shaft rotates during the progress of the vehicle over a surface, the agitator will correspondingly rotate. Preferably said agitator is formed of a single strip of thin sheet metal having alternate loops 17 and 17' extended in opposite directions crosswise of shaft 12, so that when the agitator is rotated by the movement of the vehicle, the terminal portions of the loops will move in proximity to and concentrically relative to the curved bottom 5 without necessarily actually scraping the bottom and will act to keep the material to be spread broken up but will not cause any displacement thereof. It will be seen that the leaves 7 and 8 when closed act as a protector for the thin metal agitator.

The outlets 6 in bottom 5 are controlled and covered wholly or partially as may be desired, as by means of an adjustable member 18 which underlies the bottom of member 5 and is generally similar to member 5, particularly in that the member 18 has openings 19 of such size and so disposed that when member 18 is shifted longitudinally, the openings 19 may wholly or but partially register with openings 6, or the portions 20 between adjacent openings 19 may completely close the openings 6 and thereby prevent material from being discharged from the vehicle.

As shown in Fig. 3, member 5 is fixed to end 4 by rivets or bolts 21 which also serve to attach a plate 22 on the rear side of end 4, said plate being folded at 22a to provide a channel in which a correspondingly folded portion 18a of member 18 is slidable. The front edge of member 18 is similarly supported on end wall 1, as shown in Fig. 2, except that between plate 22 and wall 1 an angle piece 23 has a portion 23a attached to wall 1 between plate 22 and said wall. Thus, similar guides are provided on walls 1 and 4 for the adjustable bottom 18. Member 18 is adjusted in its said guides transversely of the body B as by means of a manually operable lever 24 hinged to wall 4 at a point 25 and is pivotally connected to member 18 at a point 26. Said operating lever has a hand grip 27 bent outwardly therefrom so that the lever may be readily grasped and moved for adjusting the apertures 19 selectively with respect to the apertures 6 in bottom 5 and thereby regulating the quantity of material discharged from the vehicle as it is moved over a surface and the resultant depth of material so spread, as well as to completely close the vehicle apertures against discharge of any material therefrom.

A suitable handle H is attached to an end of the body for either pulling or pushing the vehicle over a surface and may include as shown laterally spaced similar members 28 and 29 with an intermediate cross bar 30 arcuate portions 31 welded or otherwise fixed to the outer sides of walls 2 and 3 and rearwardly inclined portions 32 formed with portions 33 bent inwardly and adapted to overlie and engage a supporting surface for holding the vehicle in upright position as shown in Fig. 1. When the vehicle is being propelled over a surface, the vehicle is tilted slightly forwardly so that portions 33 will move in a plane substantially above the surface. Member 23 serves as a guard as the vehicle is propelled forwardly for preventing damage to member 18 from contact with obstacles in the path of the cart as it is moved over the ground.

Thus, it is apparent that we have provided a vehicle of general utilitarian character which may be used for carting articles or materials of various kinds, as when the leaves 7 and 8 are closed, and due to the shape of the body such carried articles or materials may be readily dumped by tilting the vehicle forwardly and then retracting the same from its previous load. When used as a spreader, as for lime or other chemicals usually applied to the soil, fertilizer, sand, earth or otherwise, such materials may be uniformly spread upon a surface in measured quantities or thickness. A particular feature of our cart and spreader consists in forming the apertures 6 and 19 in members 5 and 18 at slight but sufficient angles with respect to the longitudinal axis of the vehicle and its path of movement so that regardless of the width of the openings in the bottom through which the material is discharged, there can be no lanes or spaces remaining on the treated surfaces which are bereft of the applied materials.

What we claim is:

1. A wheeled vehicle having a body with a downwardly convex bottom, provided with apertures therein, an axle mounted in the body and extending transversely through said bottom, wheels secured to and rotating said axle and supporting said body, a closure member conforming to said botom and adjustable thereon, means for adjusting said closure member to open and close the apertures to a required extent, an agitating member of zigzag form formed from thin sheet metal secured to said axle having alternate loops extended in opposite directions across the axle with the thin edges of the transverse arms of the loops in transverse planes relative to the shaft and the relatively narrow ends of the loops parallel to the shaft and shaped to conform to but not scrape the bottom of the hopper.

2. In a wheeled vehicle having a body with a downwardly convex bottom, provided with apertures therein, an axle mounted in the body and extending transversely through said bottom, wheels secured to and rotating said axle and supporting said body, a closure member conforming to said bottom and adjustable thereon, means for adjusting said closure member to open and close the apertures to a required extent, and including: an agitating member of zigzag form formed from thin sheet metal secured to said axle having alternate loops extended in opposite directions across the axle with the thin edges of the transverse arms of the loops in transverse planes relative to the shaft and the relatively narrow ends of the loops parallel to the shaft and shaped to conform to but not scrape the botom of the hopper.

ARTHUR J. PIERSON.
JOSEPH E. MANNING.

REFERENCES CITED

The following references are of record in the file of this patent:

UNITED STATES PATENTS

| Number | Name | Date |
|---|---|---|
| 1,733,722 | Cotner | Oct. 29, 1929 |
| 1,928,859 | Kutscha | Oct. 3, 1933 |
| 2,201,224 | Buchen | May 21, 1940 |

FOREIGN PATENTS

| Number | Country | Date |
|---|---|---|
| 175,415 | Canada | Feb. 27, 1917 |